United States Patent
Jacob et al.

(10) Patent No.: US 9,658,347 B2
(45) Date of Patent: May 23, 2017

(54) DIGITAL X-RAY DETECTOR HAVING MULTI-TAP PIXELS

(71) Applicant: GENERAL ELECTRIC COMPANY, Schenectady, NY (US)

(72) Inventors: Biju Jacob, Schenectady, NY (US); Jianjun Guo, Ballston Spa, NY (US); Brian David Yanoff, Schenectady, NY (US); Uwe Wiedmann, Clifton Park, NY (US)

(73) Assignee: GENERAL ELECTRIC COMPANY, Niskayuna, NY (US)

( * ) Notice: Subject to any disclaimer, the term of this patent is extended or adjusted under 35 U.S.C. 154(b) by 2 days.

(21) Appl. No.: 14/739,981

(22) Filed: Jun. 15, 2015

(65) Prior Publication Data

US 2016/0363674 A1  Dec. 15, 2016

(51) Int. Cl.
- *G01T 1/24* (2006.01)
- *H04N 5/32* (2006.01)
- *H04N 5/355* (2011.01)
- *H04N 5/3745* (2011.01)

(52) U.S. Cl.
CPC ............ *G01T 1/247* (2013.01); *H04N 5/32* (2013.01); *H04N 5/3205* (2013.01); *H04N 5/35572* (2013.01); *H04N 5/37452* (2013.01)

(58) Field of Classification Search
USPC ....................................................... 378/98.8
See application file for complete search history.

(56) References Cited

U.S. PATENT DOCUMENTS

| | | | |
|---|---|---|---|
| 6,088,490 A * | 7/2000 | Iwata ................. | G06T 1/20 382/312 |
| 6,831,690 B1 | 12/2004 | John et al. | |
| 7,498,584 B2 * | 3/2009 | Moody ............ | H01L 27/14609 250/370.09 |
| 7,923,673 B2 | 4/2011 | Buttgen et al. | |

(Continued)

FOREIGN PATENT DOCUMENTS

| | | |
|---|---|---|
| EP | 2749904 A2 | 7/2014 |
| KR | 101420250 B | 7/2014 |

(Continued)

OTHER PUBLICATIONS

Tubert, Cedric et al.; "High Speed Dual Port Pinned-photodiode for Time-of-Flight Imaging;" IISW Symposium Jun. 2009; 3 pages.

(Continued)

*Primary Examiner* — Phillip A Johnston
(74) *Attorney, Agent, or Firm* — Fletcher Yoder, P.C.

(57) ABSTRACT

A digital X-ray detector is provided. The digital X-ray detector includes multiple pixels, each pixel including a pinned photodiode, and multiple readout channels coupled to each pinned photodiode, wherein each readout channel includes at least one charge-storage capacitor, an amplifier, and a transfer gate. The digital X-ray detector also includes control circuitry coupled to each pixel of the multiple pixels and configured to selectively control a flow of photocharge generated by each pinned photodiode to a respective at least one charge-storage capacitor of each respective readout channel via control of each respective transfer gate of each respective readout channel.

18 Claims, 8 Drawing Sheets

(56) References Cited

U.S. PATENT DOCUMENTS

| | | |
|---|---|---|
| 8,426,828 B2 * | 4/2013 | Dierickx .................. G01J 1/44 |
| | | 250/371 |
| 2007/0104311 A1 | 5/2007 | Possin et al. |
| 2007/0211858 A1 | 9/2007 | Franklin et al. |
| 2010/0104071 A1 | 4/2010 | Nys |
| 2012/0002089 A1 * | 1/2012 | Wang ................ H01L 27/14603 |
| | | 348/297 |
| 2013/0170615 A1 | 7/2013 | Wei et al. |
| 2013/0343522 A1 | 12/2013 | Yoon et al. |
| 2015/0021487 A1 | 1/2015 | Sano et al. |

FOREIGN PATENT DOCUMENTS

| | | |
|---|---|---|
| RU | 2498460 C1 | 11/2013 |
| WO | 2011110985 A1 | 9/2011 |
| WO | 2014097546 A1 | 6/2014 |

OTHER PUBLICATIONS

Kim, Seon-Jin et al.; "A Three-Dimensional Time-of-Flight CMOS Image Sensor With Pinned-Photodiode Pixel Structure;" IEEE Electron Device Letters, vol. 31, No. 11, Nov. 2010.

PCT Search Report and Written Opinion issued in connection with related Appliction No. PCT/US2016/035254 on Jul. 27, 2016.

* cited by examiner

DIGITAL X-RAY DETECTOR HAVING MULTI-TAP PIXELS

BACKGROUND

The subject matter disclosed herein relates to digital X-ray detectors, and more specifically, to pixels of the digital X-ray detectors.

Digital X-ray imaging systems are becoming increasingly widespread for producing digital data which can be reconstructed into useful radiographic images. In current digital X-ray imaging systems, radiation from a source is directed toward a subject, typically a patient in a medical diagnostic application. A portion of the radiation passes through the patient and impacts a detector. The scintillator of the detector converts the radiation to light photons that are sensed. The detector is divided into a matrix of discrete picture elements or pixels, and encodes output signals based upon the quantity or intensity of the radiation impacting each pixel region, as measured by a receptor. The signals may then be processed to generate an image that may be displayed for review.

It may be desirable in digital X-ray imaging systems, e.g., utilizing certain types of detectors such as complementary metal-oxide-semiconductor (CMOS) detectors, to have a greater dynamic range and greater temporal resolution. However, the detectors may have a fixed charge conversion gain or factor (CF) and its temporal resolution may be limited by its frame rate. Therefore, it may be desired to improve upon the pixel structure of the detectors to increase the dynamic range and/or frame rate of the detector.

BRIEF DESCRIPTION

These and other features, aspects, and advantages of the present subject matter will become better understood when the following detailed description is read with reference to the accompanying drawings in which like characters represent like parts throughout the drawings, wherein:

In accordance with a first embodiment, a digital X-ray detector is provided. The digital X-ray detector includes multiple pixels, each pixel including a pinned photodiode, and multiple readout channels coupled to each pinned photodiode, wherein each readout channel includes at least one charge-storage capacitor, an amplifier, and a transfer gate. The digital X-ray detector also includes control circuitry coupled to each pixel of the multiple pixels and configured to selectively control a flow of photocharge generated by each pinned photodiode to a respective at least one charge-storage capacitor of each respective readout channel via control of each respective transfer gate of each respective readout channel.

In accordance with a second embodiment, an X-ray imaging method is provided. The method includes on a digital X-ray detector including multiple pixels, wherein each pixel includes a pinned photodiode, multiple readout channels coupled to the pinned photodiode, and each readout channel includes at least one charge-storage capacitor, an amplifier, and a transfer gate performing the following steps. The steps include resetting a capacitance of each pixel and, during integration, generating a photocharge in each pinned photodiode. The steps also include, during integration, for each pixel, diverting a first portion of the photocharge to a first charge-storage capacitor of a first readout channel of the multiple readout channels coupled to a respective pinned photodiode and diverting a second portion of the photocharge to a second charge-storage capacitor of a second readout channel of the multiple readout channels coupled to the respective pinned photodiode. The steps further include reading out from each pixel of the multiple pixels, via readout circuitry, image data from the first and second readout channels. The steps still further include generating an exposure image based on the image data acquired from the first readout channel, the second readout channel, or both the first and second readout channels of each pixel of the multiple pixels.

In accordance with a third embodiment, an X-ray imaging method is provided. The method includes on a digital X-ray detector including multiple pixels, wherein each pixel includes a pinned photodiode, multiple readout channels coupled to the pinned photodiode, and each readout channel includes at least one charge-storage capacitor, an amplifier, and a transfer gate, and wherein the multiple readout channels include a first readout channel coupled to the pinned photodiode having a first charge-storage capacitor, a first amplifier, and a first transfer gate and a second readout channel coupled to the pinned photodiode having a second charge-storage capacitor, a second amplifier, and a second transfer gate, performing the following steps. The steps include controlling the first and second transfer gates of each respective readout channel of the multiple readout channels of each respective pixel of the multiple pixels, via control signals from control circuitry coupled to each pixel of the multiple pixels, in synchrony with X-ray source pulse signals to divert a first photocharge derived from X-rays emitted at a first X-ray spectrum to the first charge-storage capacitor and to divert a second photocharge derived from X-rays emitted at a second X-ray spectrum to the second charge-storage capacitor, and the first X-ray spectrum is different from the second X-ray spectrum. The steps also include reading out from each pixel of the multiple pixels, via readout circuitry, image data from the first and second readout channels. The steps further include generating a first exposure image based on the image data acquired from the first readout channel and a second exposure image based on the image data acquired from the second readout channel of each pixel of the multiple pixels during sequential X-ray exposures at different X-ray spectrums.

BRIEF DESCRIPTION OF THE DRAWINGS

These and other features, aspects, and advantages of the present subject matter will become better understood when the following detailed description is read with reference to the accompanying drawings in which like characters represent like parts throughout the drawings, wherein.

having multiple taps (i.e., readout channels) during a multi-energy X-ray imaging application.

DETAILED DESCRIPTION

One or more specific embodiments of the present subject matter will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present subject matter, the articles "a," "an," "the," and "said" are intended to mean that there are one or more of the elements. The terms "comprising," "including," and "having" are intended to be inclusive and mean that there may be additional elements other than the listed elements.

The present disclosure provides for methods and systems to perform various X-ray imaging techniques utilizing a digital X-ray detector that includes discrete picture elements or pixels that each has multiple taps (i.e., readout channels). For example, the digital X-ray detector may be a complementary metal-oxide-semiconductor (CMOS) based detector. The multi-tap pixels may be utilized in conjunction with the techniques described below to increase the dynamic range and/or temporal resolution of the detector. The techniques discussed below may enable a gain or conversion factor (CF) of the detector to be set to a desired level prior to an imaging run (i.e., depending on the specific imaging application). In addition, the techniques discussed below may increase the dynamic range of the detector (e.g., enable acquisition of image data with different CFs from the same pixel). Further, the techniques discussed below may enable the acquisition of image data at a higher temporal resolution during multi-spectral X-ray imaging. The techniques described below may be utilized in a variety of radiographic imaging systems, such as computed tomography (CT) systems, fluoroscopic imaging systems, mammography systems, tomosynthesis imaging systems, conventional radiographic imaging systems, and so forth. However, it should be appreciated that the described techniques may also be used in non-medical contexts (such as security and screening systems and non-destructive detection systems).

Figure 1:
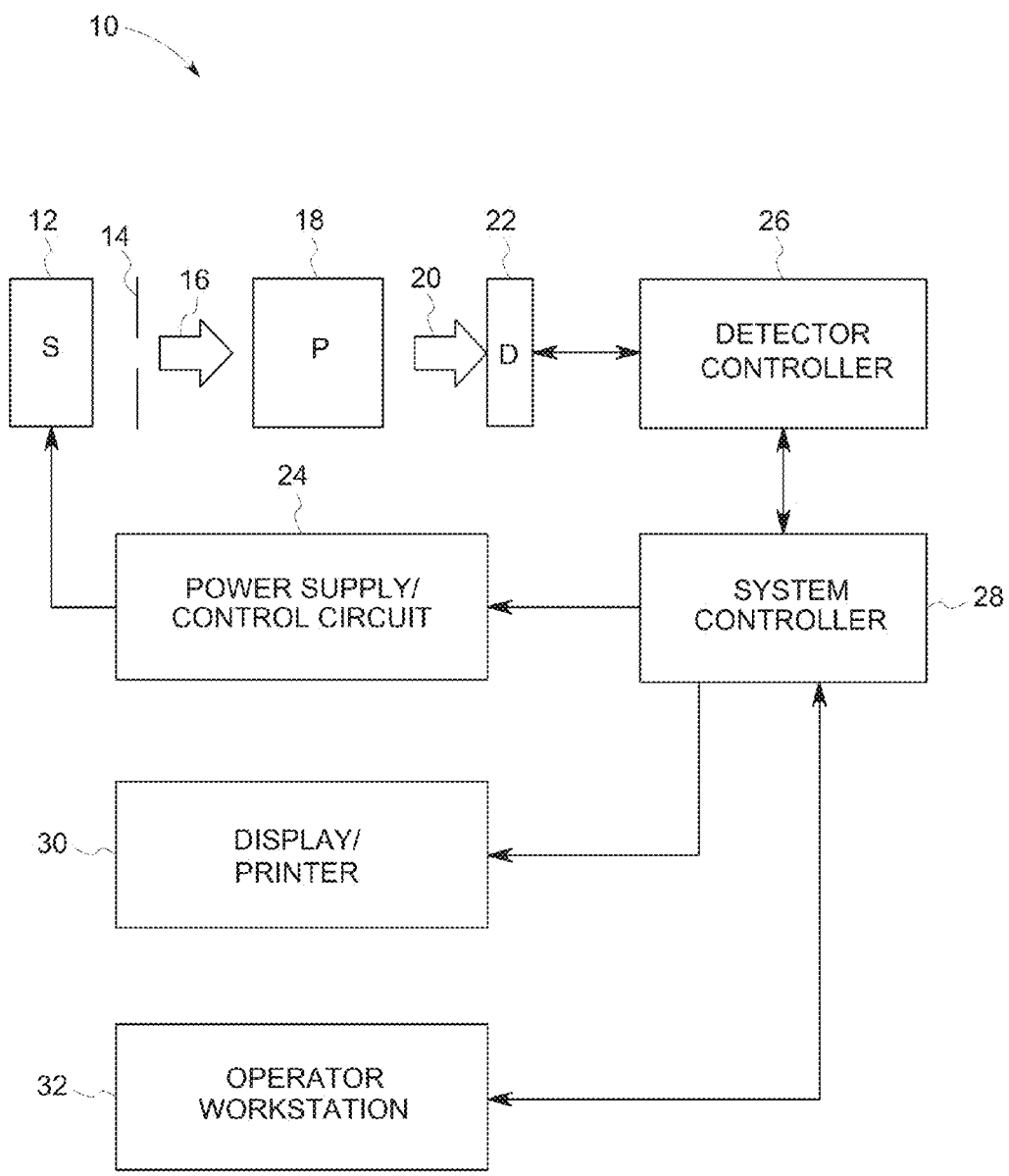
FIG. 1 is a diagrammatical overview of an embodiment of a digital X-ray imaging system, in accordance with aspects of the present techniques.

Turning now to the drawings, FIG. 1 illustrates diagrammatically an imaging system 10 for acquiring and processing discrete pixel image data. In the illustrated embodiment, system 10 is a digital X-ray system designed both to acquire original image data and to process the image data for display in accordance with the present technique. The imaging system 10 may be a stationary system disposed in a fixed X-ray imaging room or a mobile X-ray system. In the embodiment illustrated in FIG. 1, imaging system 10 includes a source of X-ray radiation 12 positioned adjacent to a collimator 14. Collimator 14 permits a stream of radiation 16 to pass into a region in which a subject, such as a human patient 18 is positioned. A portion of the radiation 20 passes through or around the subject and impacts a digital X-ray detector (e.g., CMOS detector), represented generally at reference numeral 22. The detector 22 may be portable or permanently mounted to the system 10. In certain embodiments, the detector 22 may convert the X-ray photons incident on its surface to lower energy photons, and subsequently to electric signals, which are acquired and processed to reconstruct an image of the features within the subject. In other embodiments, such as in a direct conversion implementation, the incident radiation itself may be measured without an intermediary conversion process.

Source 12 is controlled by a power supply/control circuit 24 which furnishes both power and control signals for examination sequences. Moreover, detector 22 includes a detector controller 26 which commands acquisition of the signals generated in the detector 22. Detector controller 26 may also execute various signal processing and filtration functions, such as for initial adjustment of dynamic ranges, interleaving of digital image data, and so forth. Both power supply/control circuit 24 and detector controller 26 are responsive to signals from a system controller 28. In general, system controller 28 commands operation of the imaging system to execute examination protocols and to process acquired image data. In the present context, system controller 28 also includes signal processing circuitry, typically based upon a general purpose or application-specific digital computer; and associated manufactures, such as optical memory devices, magnetic memory devices, or solid-state memory devices, for storing programs and routines executed by a processor of the computer to carry out various functionalities (e.g., setting duty cycle for controls signals (e.g., pulse-width modulation (PWM) signals)), as well as for storing configuration parameters and image data; interface protocols; and so forth. In one embodiment, a general or special purpose computer system may be provided with hardware, circuitry, firmware, and/or software for performing the functions attributed to one or more of the power supply/control circuit 24, the detector controller 26, and/or the system controller 28 as discussed herein.

In the embodiment illustrated in FIG. 1, system controller 28 is linked to at least one output device, such as a display or printer as indicated at reference numeral 30. The output device may include standard or special purpose computer monitors and associated processing circuitry. One or more operator workstations 32 may be further linked in the system for outputting system parameters, requesting examinations, viewing images, and so forth. In general, displays, printers, workstations, and similar devices supplied within the system may be local to the data acquisition components, or may be remote from these components, such as elsewhere within an institution or hospital, or in an entirely different location, linked to the image acquisition system via one or more configurable networks, such as the Internet, virtual private networks, and so forth.

The detector 22 includes an imaging detector controller or IDC which will typically be configured within the detector controller 26. The IDC includes a CPU or digital signal processor, as well as memory circuits for commanding acquisition of sensed signals from the detector. In one implementation, the IDC is coupled via two-way fiberoptic conductors to detector control circuitry within the detector 22. In certain presently contemplated embodiments, other communications systems and technologies may be used, such as Ethernet communications protocols, and wireless communications devices and protocols. The IDC thereby exchanges command signals for image data within the detector during operation.

Detector control circuitry receives DC power from a power source. Detector control circuitry is configured to originate timing and control commands for row and column electronics used to acquire image data during data acquisition phases of operation of the system. The detector control circuitry therefore transmits power and control signals to reference/regulator circuitry, and receives digital image pixel data from the reference/regulator circuitry.

In a present embodiment, detector 22 consists of a scintillator that converts X-ray photons received on the detector surface during examinations to lower energy (light) photons. An array of photodetectors or pixels then converts the light photons to electrical signals which are representative of the number of photons or the intensity of radiation impacting individual pixel regions of the detector surface. Readout electronics convert the resulting analog signals to digital values that can be processed, stored, and displayed, such as in a display 30 or a workstation 32 following reconstruction of the image. In a present form, the array of pixels is formed of silicon CMOS. The array elements are organized in rows and columns, with each element consisting of a photodiode (e.g., pinned photodiode having p+implants) and at least three transistors (e.g., metal-oxide-semiconductor field-effect transistors (MOFSETs): an amplifier transistor, a reset transistor, and a row select transistor. As described in greater detail below, each array element or pixel may include a photodiode coupled to one or more readout channels, wherein each readout channel includes at one charge-storage capacitor, an amplifier, and a transfer gate.

Figure 2:
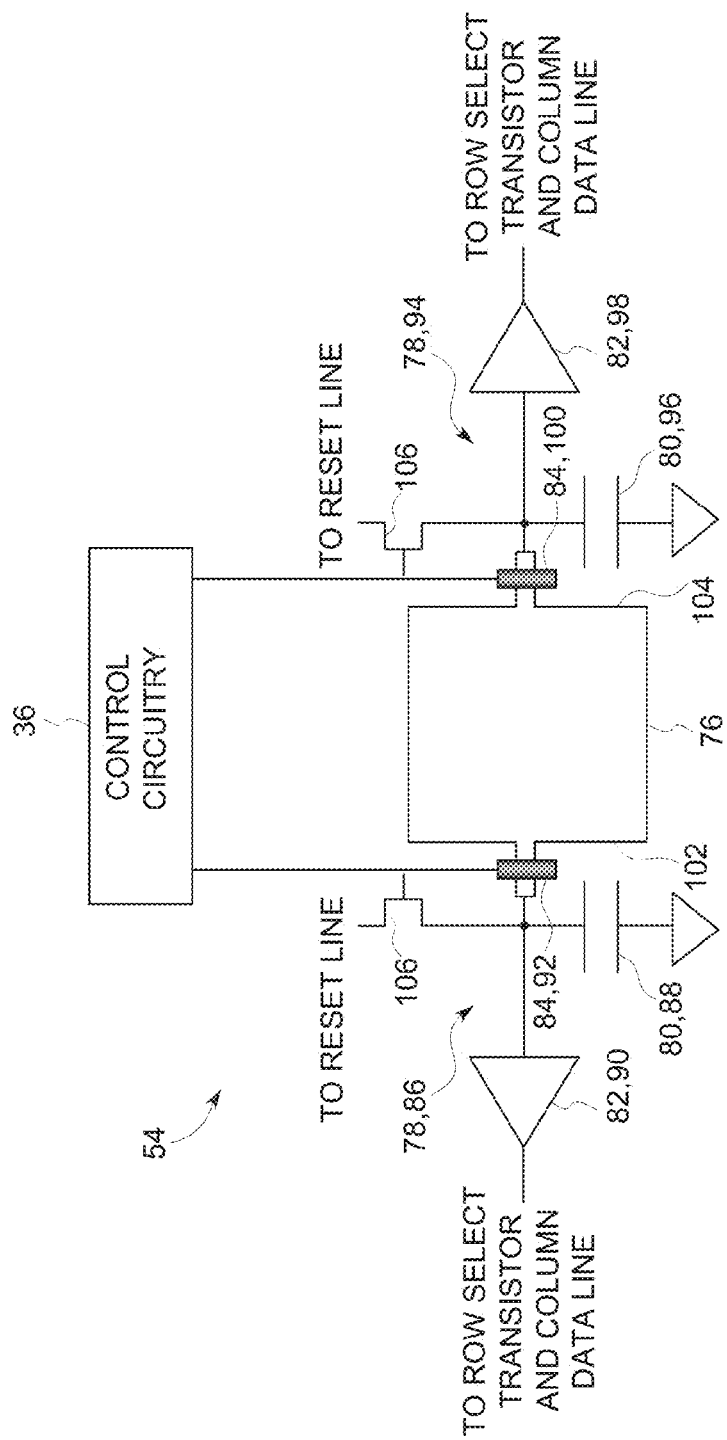
FIG. 2 is a schematic diagram of an embodiment of a pixel (e.g., CMOS pixel) having dual taps (i.e., readout channels)

FIG. 2 is a schematic diagram of an embodiment of a pixel 54 (e.g., CMOS pixel) having dual taps (i.e., readout channels). The pixel 54 includes a photodiode 76 (e.g., pinned photodiode) coupled to a plurality of taps or readout channels 78 (e.g., 2, 3, 4, 5, or more readout channels 78). As depicted, the pixel 54 is a dual tap pixel 54. Each readout channel 78 includes at least one sense node or charge-storage capacitor 80, an amplifier 82, and a transfer gate 84. In certain embodiments, instead of a transfer gate 84, a number of transistor switches may be utilized. The capacitance of the pinned photodiode 76 is negligible compared to the capacitance of the charge-storage capacitors 80 of the readout channels 78 coupled to the photodiode 76. As depicted, the pixel 54 includes a first readout channel 86 coupled to the photodiode 76 that includes a first charge-storage capacitor 88, a first amplifier 90, and a first transfer gate 92. The pixel 54 also includes a second readout channel 94 coupled to the photodiode 76 that includes a second charge-storage capacitor 96, a second amplifier 98, and a second transfer gate 100. The taps or readout channels 78 may be coupled to different sides or edges of the photodiode 76. As depicted, the first readout channel 86 is coupled to a first side or edge 102 of the photodiode 76 and the second readout channel 94 is coupled to a second side or edge 104 of the photodiode 76. In other embodiments, multiple taps or readout channels 78 (e.g., 2, 3, 4, or more readout channels 78) may be coupled to a same side or edge of the photodiode 76. The taps or readout channels 78 may be disposed physically close to each other (e.g., disposed within a few microns (μm) of each other). For example, the taps or readout channels 78 may be disposed 0.5 to 10 μm from each other so that a photocharge generated by the photodiode 76 may be distributed to any tap or readout channel 78. In certain embodiments, each readout channel 78 may include more than one charge-storage capacitor 80 (e.g., 2, 3, 4, or more charge-storage capacitors 80). In embodiments with readout channels 78 including more than one charge-storage capacitor 80, the charge-storage capacitors 80 of a readout channel may include the same capacitance or different capacitances.

Each readout channel 78 is electrically coupled to a source of a reset transistor 106 (e.g., MOFSET) having a drain coupled to a reset line (not shown) coupled to a supply voltage. The reset transistor 106 clears the electrical charge (i.e., integrated charge) after readout in the readout channel 78 (i.e., resets the capacitance of the pixel 76 (e.g., photodiode 76 and charge storage capacitor 80)) prior to an exposure and integration. The source of the reset transistor 106 is also electrically coupled to the amplifier 82. The amplifier 82 of each readout channel 78 is connected to a column data line through a row selection transistor. The electrical charge stored within each charge-storage capacitor 80 is amplified and buffered via the respective amplifier node and fed onto a common data line to be read out through the row select transistor. In certain embodiments, readout circuitry may be shared by more than readout channel to reduce circuit complexity.

In addition, each transfer gate 84 is coupled to control circuitry 36 (e.g. detector control circuitry) that selectively controls the transfer gates 84 by turning them on (i.e., placed in conducting state) and off (i.e., placed in non-conducting state) via control signals. In certain embodiments, the control circuitry 36 may control transistor switches (if present) within the readout channels 78. In certain embodiments, the control signals may be PWM signals set at a particular duty cycle depending on the imaging application (e.g., fluoroscopy, mammography, etc.). In other embodiments, the control signals may be other types of signals (e.g., DC signals). As described in greater detail below, control of the on/off state of the transfer gates 84 and/or switches during integration may be independent of the timing signals for the emission of the X-rays. In other embodiments (e.g., during multi-energy X-ray imaging applications), control signals applied, during integration, to alter the on/off state of the transfer gates 84 and/or switches may be applied in synchrony with the X-ray source (or X-ray tube) pulse signals. In certain embodiments, electrical steering may be utilized to bias the photocharge to flow into a selected tap or readout channel 78. For example, the voltage of the readout channels 78 not desired for the photocharge (e.g., first readout channel 86) may be biased with opposite polarity from the desired readout channel 78 to repel and steer the charge into the desired readout channel 78 (e.g., second readout channel 94).

After the scintillator converts X-rays into light photons, the photodiode 76 converts the light photons into electrons and generates an electrical charge (e.g., photocharge). As described in greater detail below, the control signals from the control circuitry 36 will control (e.g., selectively control) the transfer gates 84 of the readout channels 78 to divert during integration particular portions of the generated photocharge to the charge-storage capacitors 84 of the readout channels 78. As described in greater detail below, the structure of the multi-tap pixel 54, in combination with the control circuitry 36 enables multiple functions for the detector 22 and the pixel 76 including extended dynamic range and fast multi-energy X-ray imaging with increased temporal resolution.

Figure 3:
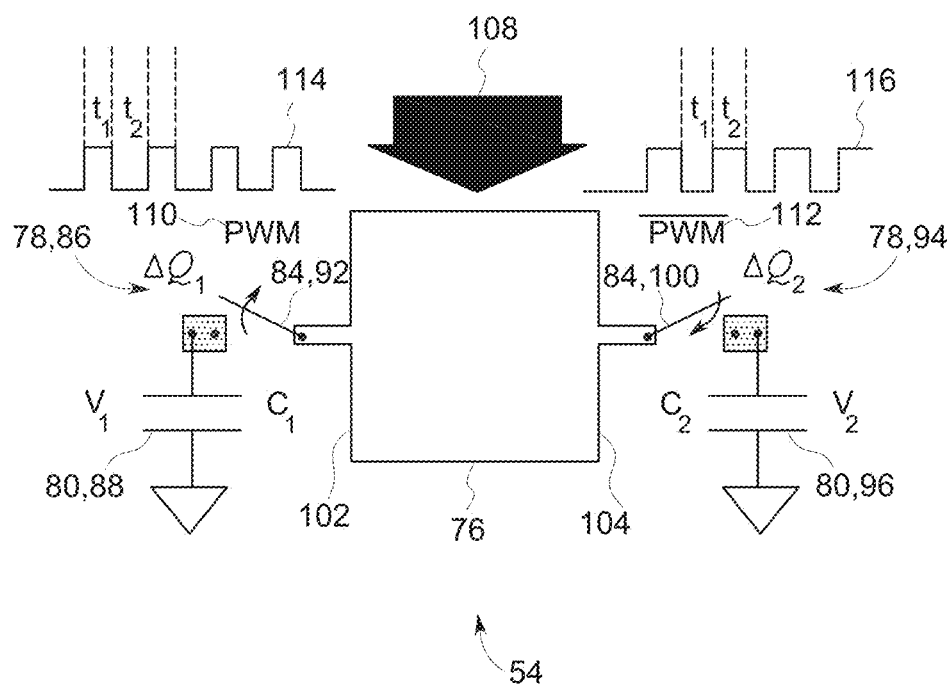
FIG. 3 is a schematic diagram of an embodiment of the operation of the pixel (e.g., CMOS pixel) of FIG. 2.

FIG. 3 is a schematic diagram of an embodiment of the operation of the pixel 54 (e.g., CMOS pixel) of FIG. 2. The pixel 54 depicted in FIG. 3 is as described in FIG. 2. For simplicity, some of the components (e.g., control circuitry 36, amplifiers 82, reset transistors 106, etc.) described in FIG. 2 are not shown in FIG. 3. The operation of the pixel 54 in FIG. 3 is depicted during a single X-ray exposure at a single kVp. The photodiode 76 (e.g., pinned photodiode) converts light photons 108 generated by scintillator into electrons and generates a photocharge. Control signals are applied via the control circuitry 36 (independent of the timing signals for the emission of the X-rays) to the transfer gates 84 to turn them on and off during integration to divert the photocharge among the readout channels 84 (i.e., to specific charge-storage capacitors). As depicted, the control signals are PWM signals (e.g., PWM signal 110 applied to the transfer gate 92 and PWM signal 112 applied at the transfer gate 100) set at a specific duty cycle. By setting the duty cycle of the PWM signals 110, 112, different CFs may be implemented in the same pixel 54. Sequences 114, 116 represent the conductance (on/off) state of the transfer gates 92, 100, respectively, at specific times in response to respective PWM signals 110, 112. As depicted in FIG. 3, the PWM signals 110, 112 are complementary (i.e., inverted) to enable the sampling and storage of a desired fraction of the photocharge to a particular charge-storage capacitor 80. For example, during time period, $t_1$, the first transfer gate 92 is on to enable the photocharge to flow to the charge storage capacitor 88 for storage, while the second transfer gate 100 is off to block flow of the photocharge to the charge storage capacitor 96. Conversely, during time period, $t_2$, the second transfer gate 100 is on to enable the photocharge to flow to the charge storage capacitor 96 for storage, while the first transfer gate 100 is off to block flow of the photocharge to the charge storage capacitor 88. As mentioned above, in certain embodiments, electrical steering may be utilized to bias the photocharge to flow into a selected tap or readout channel 78. In certain embodiments, the control signals (e.g., PWM signals 110, 112) may not be complementary, but may include alternate patterns.

As depicted in FIG. 3, the dynamic range of the pixel 54 is increased by applying the PWM signals 110, 112 at a specific duty cycle. For example, during integration, the on time for the transfer gate 92 may be set at 10%, while the off time is set at 90%. Conversely, the on/off time for the transfer gate 100 is inverted (i.e., 90% on, 10% off) during integration. Thus, when the photocurrent is constant during integration and the capacitances of the charge-storage capacitors 88, 96 ($C_1$, $C_2$, respectively) are equal, 10% of the total photocharge is diverted to the charge-storage capacitor 88 and 90% of the total photocharge is diverted to the charge-storage capacitor 96. As a result, in this example, for a given capacitance, the readout channel 86 has nine times more saturation level than the readout channel 94. Depending on the imaging application (e.g., fluoroscopy, mammography, etc.), the on/off time of the transfer gates 88, 96 may vary. For example, the on time (or off time) for the transfer gate 88 may range from 0 to 100 percent, while the corresponding on time (or off time) for the transfer gate 100 may range from 100 to 0 percent. In embodiments, where the pixel 54 includes more than two readout channels 78, the on/off times of the respective transfer gates 84 may be proportioned differently.

By enabling the charge-storage capacitor 88 to store a smaller portion of the total photocharge compared to charge-storage capacitor 96, image data readout from the readout channel 86 has a CF value (or gain) lower than the CF value (or gain) of the image data readout from the readout channel 94. Exposure images may generated from image data acquired from the readout channels 86, the readout channels 94, or both the readout channels 86, 94 of each pixel 54. In a typical medical image, there are regions with higher signal intensity (e.g., image pixels under thin, soft tissue) compared to other regions (e.g., image pixels under bones, thick regions). In conventional detectors, the pixels associated with the higher signal intensity saturate and information is lost. In the present implementation, saturation may be avoided by utilizing the image data acquired from a low CF readout channel 78 of the pixel 54. For non-saturating regions, image data acquired from both the low and high CF readout channels 78 of the pixel 54 may be combined to generate the final image. Alternatively, for non-saturating regions image data acquired from only the high CF readout channel 78 may be utilized. Mammography may generate images with large intra-scene dynamic range. For example, pixels under the breast are exposed to fewer signal, while pixels near the skin line are exposed to a larger signal. Thus, image data with a high CF value (or gain) may be selected for pixels under the breast, while image data with a low CF value (or gain) may be selected for pixels under the skin line. Adjusting the on/off state of the transfer gates of the respective readout channels 78 of each pixel 54 (i.e., during setup or run time for an imaging sequence) enables the CF of pixels 54 (and thus the detector 22) to be altered to a desired CF for the imaging application. This is contrast to typical detectors 22, where the CF is fixed. As described in greater detail below, the dynamic range may be extended even more using multi-well pixels 54 (i.e., pixels 54 having readout channels 78 having more than one charge-storage capacitor 80).

Figure 4:
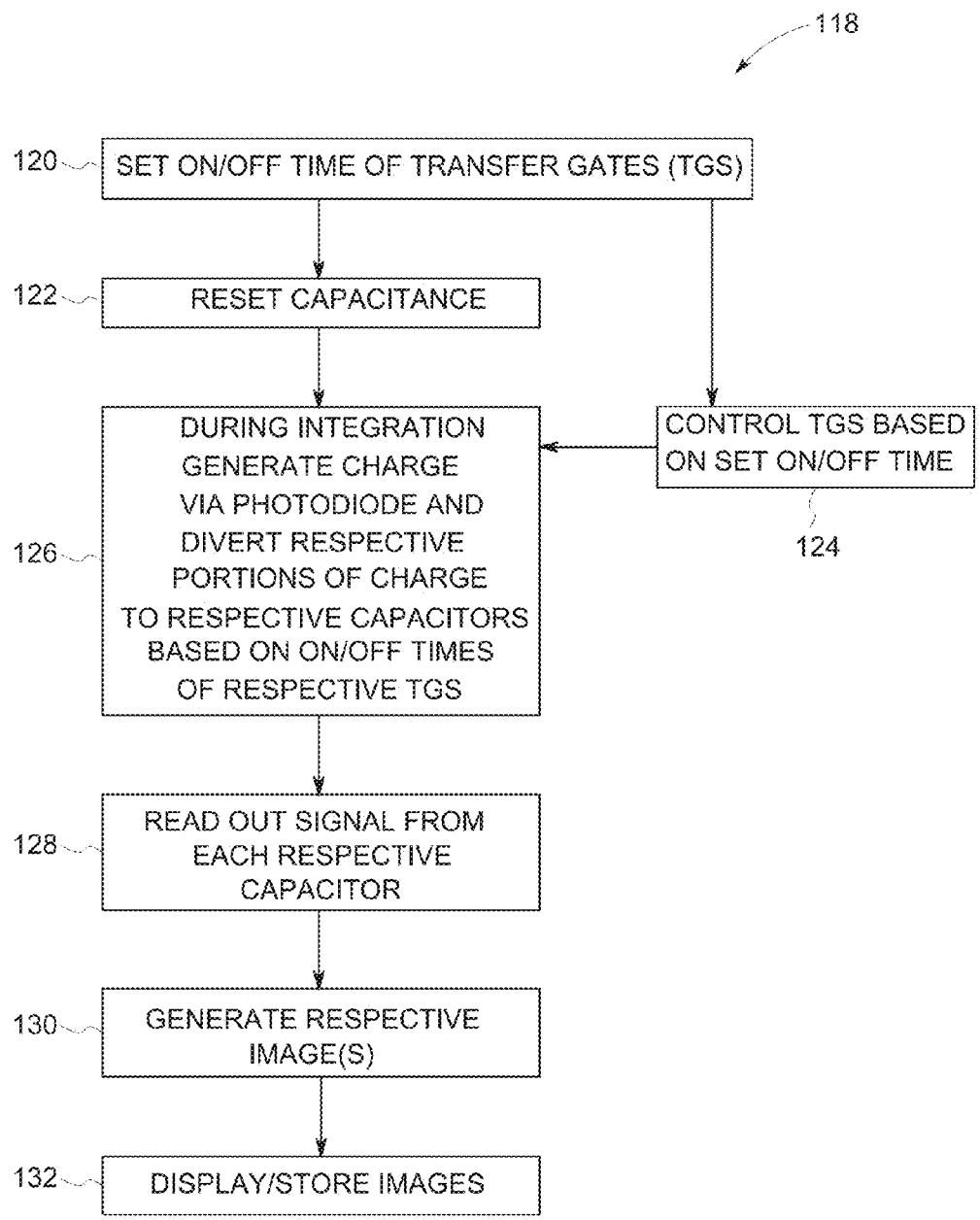
FIG. 4 is a flow diagram of an embodiment of a method for acquiring image data utilizing pixels (e.g., CMOS pixels) having multiple taps (i.e., readout channels)

FIG. 4 is a flow diagram of an embodiment of a method 118 for acquiring image data utilizing pixels 54 (e.g., CMOS pixels) having multiple taps (i.e., readout channels 78). One or more of the following steps of the method 118 may be performed by one or more components of the imaging system 10 (e.g., detector 22, detector control circuitry 36, readout circuitry, etc.). The pixels 54 utilized in the method 118 may include two or more readout channels 78. The method 118 described in FIG. 4 may be utilized during a single X-ray exposure at a single kVp. The method 118 includes setting the on/off times (e.g., via setting duty cycle of control signals (e.g., PWM signals)) of the transfer gates 84 of the respective readout channels 78 of each pixel 54 (block 120). The on/off times may be set based on the imaging application (e.g., fluoroscopy, mammography, etc.). Thus, the CFs for the pixels 54 may be altered via software during run time (i.e., preparation for an exposure or imaging application). Alternatively, the on/off times may be adjusted based on input to the imaging system 10 (e.g., via operator workstation 32) from a user. The method 120 also includes resetting the capacitance of the pixels 54 (e.g., photodiode 76 and charge-storage capacitors 80) as described above prior to an exposure and integration during the exposure (block 122) to clear any integrated charge within the pixels 54. The capacitance of the pixels may be reset prior to, subsequent to, or concurrently with setting the on/off times of the transfer gates 84. Based on the set on/off times, during integration the method 118 includes controlling (e.g., selectively controlling) the transfer gates 84 of each respective readout channel 78 (e.g., via the control circuitry 36) (block 124). As described above, in certain embodiments the control signals may be complementary. As noted above, this control of the transfer gates 84 may be independent of the timing signals for the emission of the X-rays. Concurrently, the method 118 includes, during integration, generating a photocharge via the photodiode 76 (via conversion of the received light photons) and diverting respective portions of the photocharge to respective charge-storage capacitors 80 of the readout channels 78 based on the control of the on/off times of the respective transfer gates 84 (block 126). For example, utilizing the dual tap pixel 54 of FIG. 3, a first portion of the total photocharge is diverted to the charge-storage capacitor 88 of the readout channel 86 for storage, while a second portion of the total photocharge is diverted to the charge-storage capacitor 96 of the readout channel 94 for storage. In certain embodiments, where the on/off times are the same for the transfer gates 84, the first and second photocharge portions may be the same. In other embodiments, where the on/off times differ from each other as described above in FIG. 3, a first portion of the photocharge stored in the charge-storage capacitor 88 may be different (e.g., less) than the second portion of the photocharge stored in the charge-storage capacitor 96, thus, extending the dynamic range of the pixels 54 by enabling the acquisition of image data with different CF values or gains. In certain embodiments, electrical steering may be utilized to bias the photocharge to flow into a selected tap or readout channel 78. The method 118 includes, via the readout circuitry of the detector 22, reading out the signals (i.e., image data) from each readout channel 78 (block 128). In the dual tap pixel 54 in FIG. 3, the readout stage for the pixel 54 is duplicated (one for each readout channel 78). In certain embodiments, readout of the pixels 54 (where a greater portion of the photocharge was diverted to one readout channel 78 over another) may enable the acquisition of low CF image data and high CF image data from the same pixel 54. The method 118 also includes generating one or more images (e.g., exposure images) from the image data (block 130). For example, in the dual tap pixel 54 of FIG. 3, an image may be generated from the low CF image data only, an image may be generated from the high CF image data only, and/or an image may be generated from both the low and high CF image data acquired from the pixels 54. The one or more generated images may be displayed (e.g., on display 30) or stored (e.g., on the imaging system or a hospital information system (HIS), a radiology information system (RIS), and/or picture archiving communication system (PACS)) (block 132).

Figure 5:
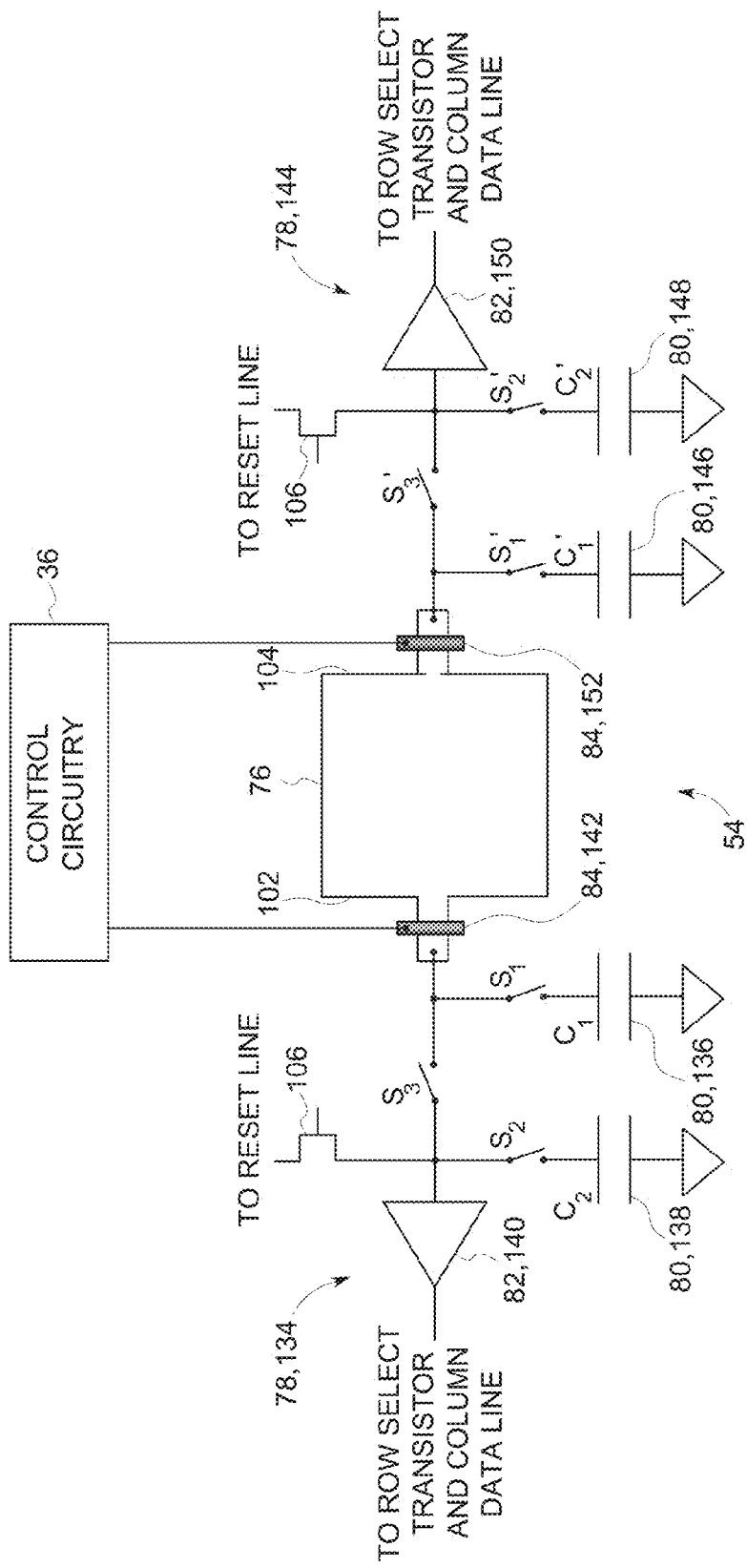
FIG. 5 is a schematic diagram of an embodiment of a (e.g., CMOS pixel) having multiple taps (i.e., readout channels) each having more than one charge-storage capacitor.

FIG. 5 is a schematic diagram of an embodiment of a (e.g., CMOS pixel) having multiple taps (i.e., readout channels 78) each having more than one charge-storage capacitor 80. In general, the pixel 54 in FIG. 5 is similar to the pixel 54 in FIG. 2 except each readout channel 78 includes more than one charge-storage capacitor 80 (e.g., dual wells). As a result of having more than one-charge storage capacitor 80, the pixels 54 in FIG. 5 have an even greater range of CF control (and thus dynamic range) than the pixel in FIG. 2. As depicted in FIG. 5, the pixel 54 includes the photodiode 76 (e.g., pinned photodiode) coupled to a plurality of taps or readout channels 78 (e.g., 2, 3, 4, 5, or more readout channels 78). As depicted, the pixel 54 is a dual tap pixel 54. Each readout channel 78 includes at least two sense nodes or charge-storage capacitor 80, an amplifier 82, and a transfer gate 84. In certain embodiments, instead of a transfer gate 84, a number of transistor switches may be utilized. The capacitance of the photodiode 76 is negligible compared to the capacitance of the charge-storage capacitors 80 of the readout channels 78 coupled to the photodiode 76. In certain embodiments, each readout channel may include more than two charge-storage capacitors 80. As depicted, the pixel 54 includes a first readout channel 134 coupled to the photodiode 76 that includes a first charge-storage capacitor 136, a second charge-storage capacitor 138, a first amplifier 140, and a first transfer gate 142. The first readout channel 134 also includes switches $S_1$, $S_2$, and $S_3$. The pixel 54 also includes a second readout channel 144 coupled to the photodiode 76 that includes a third charge-storage capacitor 146, a fourth charge-storage capacitor 148, a second amplifier 150, and a second transfer gate 152. The second readout channel 144 includes switches $S_{1'}$, $S_{2'}$, and $S_{3'}$. The taps or readout channels 78 may be coupled to different sides or edges of the photodiode 76. As depicted, the first readout channel 134 is coupled to a first side or edge 102 of the photodiode 76 and the second readout channel 144 is coupled to a second side or edge 104 of the photodiode 76. In other embodiments, multiple taps or readout channels 78 (e.g., 2, 3, 4, or more readout channels 78) having multiple wells may be coupled to a same side or edge of the photodiode 76. The taps or readout channels 78 may be disposed physically close to each other (e.g., disposed within a few microns (µm) of each other). For example, the taps or readout channels 78 may be disposed 0.5 to 10 µm from each other so that a photocharge generated by the photodiode may be distributed to any tap or readout channel 78.

Each readout channel 78 is electrically coupled to a source of a reset transistor 106 (e.g., MOFSET) having a drain coupled to a reset line (not shown) coupled to a supply voltage. The reset transistor 106 clears the electrical charge (i.e., integrated charge) after readout in the readout channel 78 (i.e., resets the capacitance of the pixel 76 (e.g., photodiode 76 and charge storage capacitor 80)) prior to an exposure and integration. The source of the reset transistor 106 is also electrically coupled to the amplifier 82. The electrical charge stored within each charge-storage capacitor 80 is amplified and buffered via the respective amplifier node and fed onto a common data line to be read out through the row select transistor. In certain embodiments, readout circuitry may be shared by more than readout channel to reduce circuit complexity.

In addition, each transfer gate 84 is coupled to control circuitry 36 (e.g. detector control circuitry) that selectively controls the transfer gates 84 by turning them on (i.e., placed in conducting state) and off (i.e., placed in non-conducting state) via control signals. In certain embodiments, the control circuitry 36 may control transistor switches (if present) within the readout channels 78. In certain embodiments, the control signals may be PWM signals set at a particular duty cycle depending on the imaging application (e.g., fluoroscopy, mammography, etc.). In other embodiments, the control signals may be other types of signals (e.g., DC signals). As described in greater detail below, control of the on/off state of the transfer gates 84 and/or switches during integration may be independent of the timing signals for the emission of the X-rays. In other embodiments (e.g., during multi-energy X-ray imaging applications), control signals applied, during integration, to alter the on/off state of the transfer gates 84 and/or switches may be applied in synchrony with the X-ray source (or X-ray tube) pulse signals. In certain embodiments, electrical steering may be utilized to bias the photocharge to flow into a selected tap or readout channel 78. For example, the voltage of the readout channels 78 not desired for the photocharge may be biased with opposite polarity from the desired readout channel 78 to repel and steer the charge into the desired readout channel 78.

The charge-storage capacitors 80 of a respective readout channel 78 may include different capacitances. For example, the charge-storage capacitors 136, 138, 146, and 148 have the respective capacitances $C_1$, $C_2$, $C_{1'}$, and $C_{2'}$. In certain embodiments, $C_1 = C_{1'}$ and $C_2 = C_{2'}$, while $C_2$ is greater (e.g., 3 to 5 times greater) than $C_1$ and $C_{1'}$ is greater (e.g., 3 to 5 times) greater than $C_2$. Under low illumination conditions, the charge-storage capacitors 136 and 146 may be selected for storage of the photocharge generated by the photodiode 76. Under high illumination conditions, the charge-storage capacitors 138 and 148 may be selected for storage of the photocharge generated by the photodiode 76. Based on selecting the desired capacitors 136 and 146 or 138 and 148 and setting the duty cycle of the control signals (e.g., PWM signals), a wider range of CF control may be achieved. Selection of the capacitors 80 and duty cycle are based on the imaging application (e.g., fluoroscopy, mammography, etc.). At the lower end, the saturation level of the pixel 54 is determined by the smallest capacitor (e.g., $C_1$ or $C_{1'}$). At the higher end, the saturation level of the pixel 54 is increased by a factor of $(1+C_2/C_1)*(1/D)$ or $(1+C_{2'}/C_{1'})*(1/D)$, where D is the lowest duty cycle feasible for the control signal (e.g., PWM signal). During integration (if charge-storage capacitors 136 and 146 are selected), when the transfer gates 142, 152 are selectively on, switches $S_1$ and $S_{1'}$ are closed and switches $S_2$, $S_{2'}$, $S_3$, and $S_{3'}$ are open to enable the photocharge to flow the capacitors 132, 146. During readout of the charge stored in the capacitors 132, 146, switches $S_1$, $S_{1'}$, $S_3$, and $S_{3'}$ are closed and switches $S_2$ and $S_{2'}$ remain open. During integration (if charge-storage capacitors 138 and 148 are selected), when the transfer gates 142, 152 are selectively on, switches $S_2$ and $S_{2'}$ are closed and switches $S_1$, $S_{1'}$, $S_3$, and $S_{3'}$ are open to enable the photocharge to flow the capacitors 138, 148. During readout of the charge stored in the capacitors 138, 148, switches $S_2$, $S_{2'}$, $S_3$, and $S_{3'}$ are closed and switches $S_1$ and $S_{1'}$ remain open.

Figure 6:
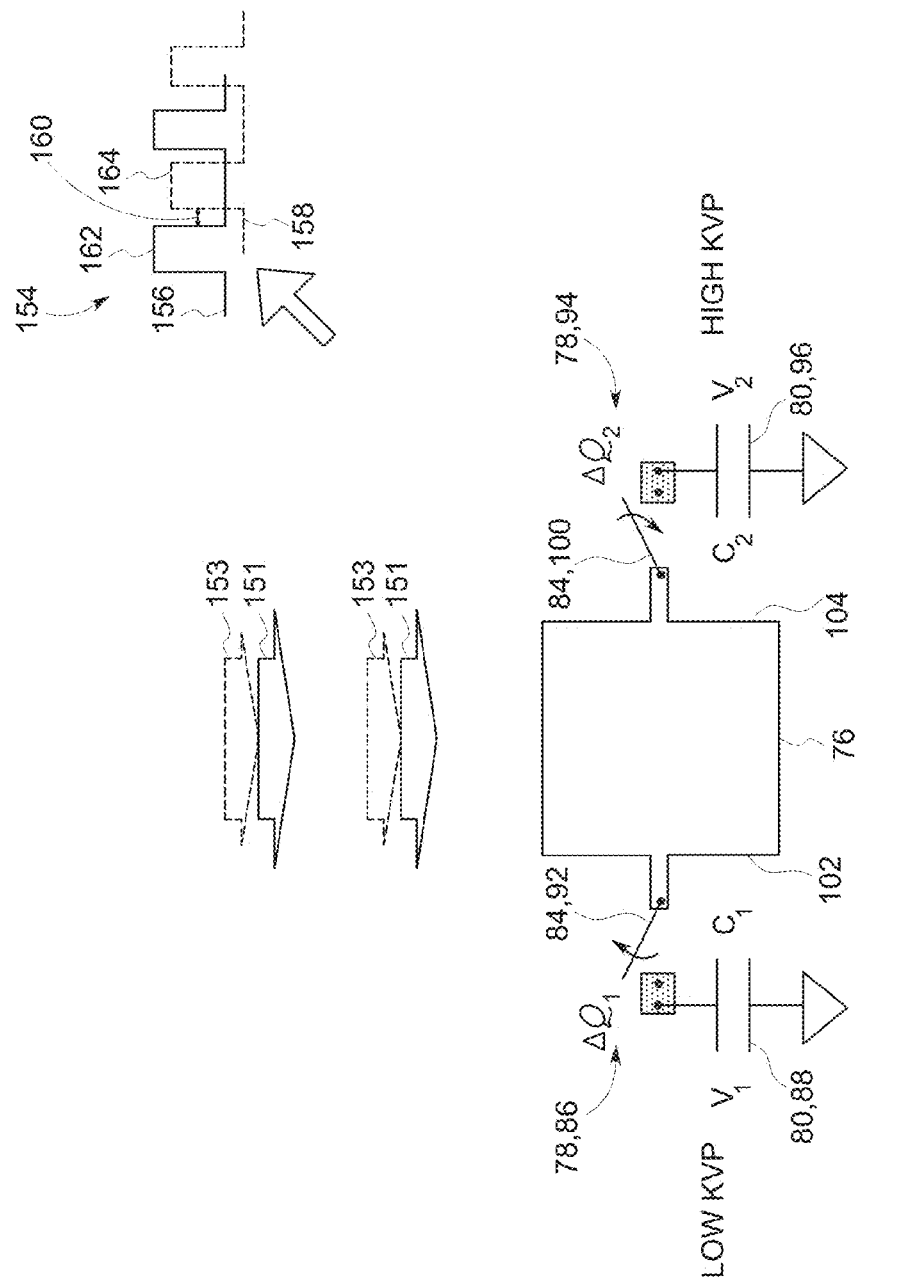
FIG. 6 is a schematic diagram of an embodiment of the operation of the pixel (e.g., CMOS pixel) of FIG. 2 during a multi-energy X-ray imaging application.

FIG. 6 is a schematic diagram of an embodiment of the operation of the pixel 54 (e.g., CMOS pixel) of FIG. 2 during a multi-energy X-ray imaging application (e.g., having different kVps such as a low kVp and a high kVp). The pixel 54 depicted in FIG. 6 is as described in FIG. 2. For simplicity, some of the components (e.g., control circuitry 36, amplifiers 82, reset transistors 106, etc.) described in FIG. 2 are not shown in FIG. 6. The operation of the pixel 54 in FIG. 6 is depicted during a multi-energy X-ray exposure sequence that repeatedly alternates between two different kVps (e.g., a low kVp and a high KVp) such as in a dual energy CT imaging application (e.g., to separate materials in an X-rayed object). The photodiode 76 (e.g., pinned photodiode) alternatively converts light photons 151 corresponding to the low kVp generated by scintillator and light photons 153 corresponding to the high kVp into electrons and generates a photocharge. Control signals are applied via the control circuitry 36 (in synchrony with the X-ray source (or X-ray tube) pulse signals to synchronize control of the transfer gates 84 with the arrival of the photons derived from the X-rays at different kVps) to the transfer gates 84 to turn them on and off during integration to divert the photocharge among the readout channels 84 (i.e., to specific charge-storage capacitors). The control signals turn on the transfer gate 92 during integration of the photocharge corresponding to the low kVp (while keeping the transfer gate 100 off) to divert the photocharge to the charge-storage capacitor 88. Subsequently, the control signals turn on the transfer gate 100 during integration of the photocharge corresponding to the high kVp (while keeping the transfer gate 92 off) to divert the photocharge to the charge-storage capacitor 96. After integration of the respective photocharges corresponding to the low and high kVps, the image data is readout sequentially from the readout channels 86 and 94 without resetting the pixel 54 in between. After readout of both readout channels 86, 94, the capacitance of the pixel 54 may be reset prior to next round of integration. As a result, the acquisition of image data may be obtained at a higher temporal resolution during multi-spectral X-ray imaging. In certain embodiments, the detector 22 may readout the pixels at a native frame rate. The overlapping readout sequence 154 illustrates the readout sequence 156 (in a solid line) from the readout channel 86 corresponding to the low kVp image data and the readout sequence 158 (in a dashed line) from the readout channel 94 corresponding to the high kVp image data. As depicted in sequence 154, by doubling the frame rate (i.e., reading two images from the same pixels 54), the temporal resolution 160 (i.e., time between the reading of the image data corresponding to both the low and high kVps 162 and 164, respectively, from the pixels 54) may be decreased from approximately 33 milliseconds (ms) to 2 to 3 ms between reading the image data 162 corresponding to the low kVp and the image data 164 corresponding to the high kVp. The utilizing of the control signals in conjunction with the multi-tap pixel 54 enables the relationship between frame rate and temporal resolution to be broken. This also enables faster (i.e., less time between X-ray pulses of different kVp) multi-energy X-ray imaging, which is limited by the frame rate of conventional detectors.

In certain embodiments, the capacitances of the charge-storage capacitors 88, 96 ($C_1$, $C_2$, respectively) are equal. In other embodiments, the capacitances of the charge storage capacitors 88, 96 are different. In certain embodiments, as described above, electrical steering may be utilized to bias the photocharge to flow into a selected tap or readout channel 78. In certain embodiments, as described above, the dynamic range may be extended by using multi-well pixels 54 (i.e., pixels 54 having readout channels 78 having more than one charge-storage capacitor 80). In certain embodiments, the pixels 54 may include three or more readout channels to enable more than two different kVps to be utilized to enable a greater number of materials to be separated utilizing multi-energy X-ray imaging.

In certain embodiments, the control signals to change the kVp in synchrony with the transfer gate switches may also be in a PWM format. In other words, there may be several switches back fourth, before the signal is read out. The PWM may depend on the kVp setting, with typically longer integration time at the low kVp, to compensate for the lower flux at the low kVp.

As discussed above, the changing in the tube spectrum may be done by switching kVp. In other embodiments, the spectrum may be switched by changing a spectral filter inside the tube-side collimator. For example, a rotating filter wheel may be utilized to quickly change the spectrum.

Figure 7:
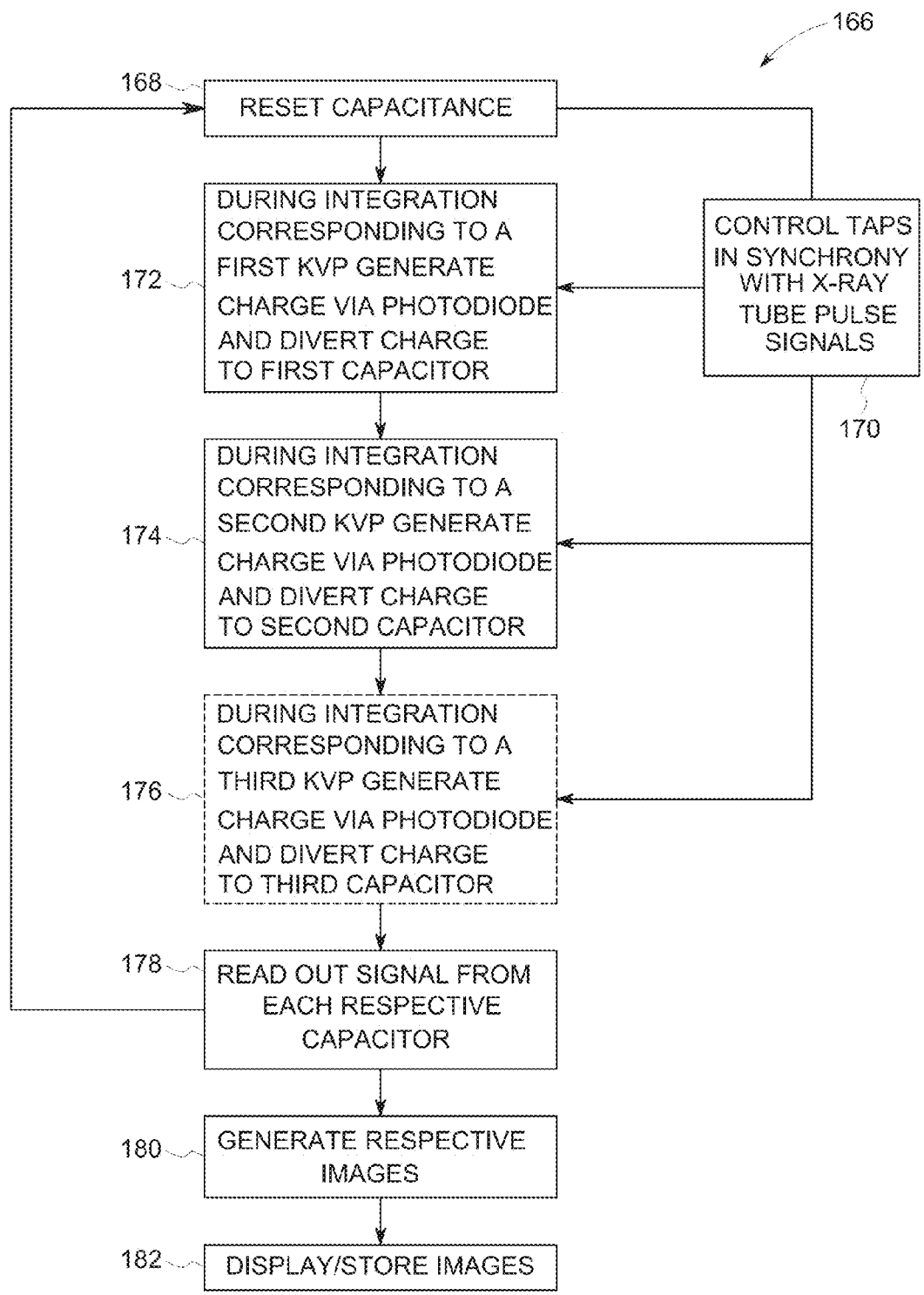
FIG. 7 is a flow diagram of an embodiment of a method for acquiring image data utilizing pixels (e.g., CMOS pixels)

FIG. 7 is a flow diagram of an embodiment of a method 166 for acquiring image data utilizing the pixels 54 (e.g., CMOS pixels) having multiple taps (i.e., readout channels 78) during a multi-energy X-ray imaging application (e.g., CT imaging application). One or more of the following steps of the method 166 may be performed by one or more components of the imaging system 10 (e.g., detector 22, detector control circuitry 36, readout circuitry, etc.). The pixels 54 utilized in the method 118 may include two or more readout channels 78. The method 166 described in FIG. 7 may be utilized during a multi-energy exposure sequence repeatedly alternating between different kVps (e.g., two (low kVp and high kVp) or three different kVps (low kVp, intermediate kVp, high kVp). The method 166 includes resetting the capacitance of the pixels 54 (e.g., photodiode 76 and charge-storage capacitors 80) as described above prior to a first sequence of a multi-energy X-ray exposure (e.g., low kVp X-ray pulse followed by a high kVp X-ray pulse) and integration during the exposure (block 168) to clear any integrated charge within the pixels 54. During integration, the method 166 includes controlling (e.g., selectively controlling) the transfer gates 84 of each respective readout channel 78 (e.g., via the control circuitry 36) in synchrony with the X-ray source (or X-ray tube) pulse signals to coordinate control of the transfer gates 84 with the arrival of the X-ray pulses of different kVps (block 170). Concurrently with step 170, the method 166 includes, during integration, generating a first photocharge via the photodiode 76 (via conversion of the received light photons corresponding to a first kVp or first X-ray spectrum (e.g., low kVp, high kVp, or intermediate kVp) and diverting the first photocharge to a first charge-storage capacitor 80 of a first readout channel 78 coupled to the photodiode 76 based on the control of the on/off times of the respective transfer gates 84 (block 172). Concurrently with step 170 and subsequent to step 172, the method 166 includes, during integration, generating a second photocharge via the photodiode 76 (via conversion of the received light photons corresponding to a second kVp or second X-ray spectrum (e.g., different from the first kVp) and diverting the second photocharge to a second charge-storage capacitor 80 of a second readout channel 78 coupled to the photodiode 76 based on the control of the on/off times of the respective transfer gates 84 (block 174). In certain embodiments, a third kVp or third X-ray spectrum (e.g., different from the first kVp and the second kVp) is utilized during multi-energy X-ray imaging and each pixel 54 includes at least a third readout channel 78. In such embodiments, concurrently with step 170 and subsequent to steps 172 and 174, the method 166 includes, during integration, generating a third photocharge via the photodiode 76 (via conversion of the received light photons corresponding to a third kVp (e.g., different from both the first and second kVps) and diverting the third photocharge to a third charge-storage capacitor 80 of a third readout channels 78 coupled to the photodiode 76 based on the control of the on/off times of the respective transfer gates 84 (block 176). In certain embodiments, electrical steering may be utilized to bias the photocharge to flow into a selected tap or readout channel 78. Also, in certain embodiments, the readout channels 78 may include more than one charge-storage capacitor 80 each as described above. The method 166 includes, via the readout circuitry of the detector 22, reading out the signals (i.e., image data) from each readout channel 78 (block 178). The image data 78 may be read out from the first, second, and (if present) third readout channels 78 sequentially without resetting the pixels 54 between the readout of the different readout channels 78 of each pixel 54. Subsequent to reading out the image data from the pixels 54 for the multi-energy X-ray exposure sequence, the capacitance of the pixels 54 is reset prior to next sequence of X-ray pulses at different kVps (block 168). The method 118 also includes generating one or more images (e.g., low kVp image, high kVp image, an image from both the low and high kVp image data, etc.) from the image data (block 180). The one or more generated images may be displayed (e.g., on display 30) or stored (e.g., on the imaging system or a hospital information system (HIS), a radiology information system (RIS), and/or picture archiving communication system (PACS)) (block 182).

Figure 8:
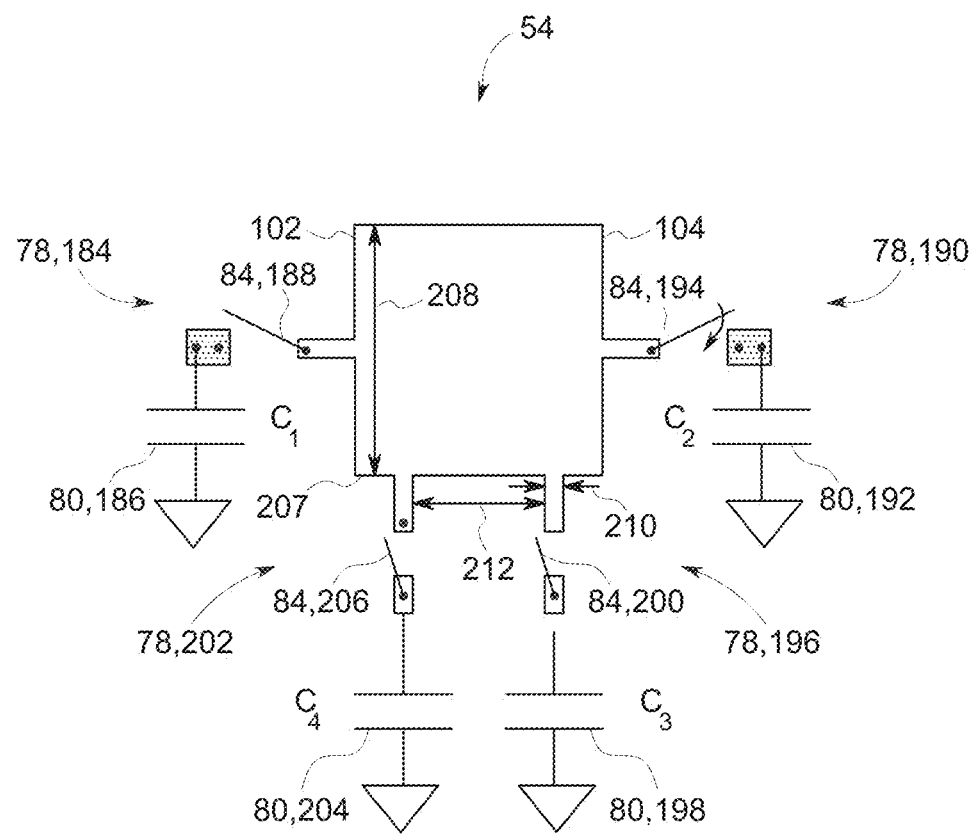
FIG. 8 is a schematic diagram of an embodiment of a pixel (e.g., CMOS pixel) having multiple taps (i.e., readout channels).

FIG. 8 is a schematic diagram of an embodiment of a pixel 54 (e.g., CMOS pixel) having multiple taps (i.e., readout channels 78). In general, the pixel 54 in FIG. 5 is similar to the pixels 54 described in the above figures except the pixel 54 includes more than two readout channels 78. As depicted in FIG. 5, the pixel 54 includes the photodiode 76 (e.g., pinned photodiode) coupled to a plurality of taps or readout channels 78. As depicted, the pixel 54 includes four readout channels 78. Each readout channel 78 includes at least one sense nodes or charge-storage capacitor 80, an amplifier (not shown), and a transfer gate 84. In certain embodiments, the readout channels 78 may share readout circuitry. In certain embodiments, instead of a transfer gate 84, a number of transistor switches may be utilized. The capacitance of the photodiode 76 is negligible compared to the capacitance of the charge-storage capacitors 80 of the readout channels 78 coupled to the photodiode 76 due to the MOS/MIM capacitance of the charge-storage capacitors 80. In certain embodiments, as described above, each readout channel 78 may include more than one charge-storage capacitor 80 to extend the dynamic range of the pixel 54. As depicted, the pixel 54 includes a first readout channel 184 coupled to the photodiode 76 that includes a first charge-storage capacitor 186, a first amplifier (not shown), and a first transfer gate 188. The pixel 54 also includes a second readout channel 190 coupled to the photodiode 76 that includes a second charge-storage capacitor 192, a second amplifier (not shown), and a second transfer gate 194. The pixel 54 further includes a third readout channel 196 coupled to the photodiode 76 that includes a third charge-storage capacitor 198, a third amplifier (not shown), and a third transfer gate 200. The pixel 54 still further includes a fourth readout channel 202 coupled to the photodiode 76 that includes a fourth charge-storage capacitor 204, a fourth amplifier (not shown), and a fourth transfer gate 206. In certain embodiments, the pixel 54 may include more than four readout channels 78. The taps or readout channels 78 may be coupled to different sides or edges of the photodiode 76.

As depicted in FIG. 8, the first readout channel 186 is coupled to a first side or edge 102 of the photodiode 76 and the second readout channel 190 is coupled to a second side or edge 104 of the photodiode 76. Also, as depicted in FIG. 8, the third readout channel 196 and the fourth readout channel 206 are coupled to a same side (and third side) 207 of the photodiode 76. In certain embodiments, more than two readout channels may be coupled to the same side of the photodiode 76. The taps or readout channels 78 may be disposed physically close to each other (e.g., disposed within a few microns (μm) of each other) on each side. For example, the photodiode 76 may have a length (e.g., width) 208 ranging from 20 to 200 μm and a width 210 of the tap or readout channel 78 may be a few μm. As a result, the taps or readout channels 78 may be disposed a distance 212 of 0.5 to 10 μm from each other so that a photocharge generated by the photodiode 76 may be distributed to any tap or readout channel 78. In certain embodiments, electrical steering may be utilized to bias the photocharge to flow into a selected tap or readout channel 78 as described above.

For example, the charge-storage capacitors 186, 192, 198, and 204 have the respective capacitances $C_1$, $C_2$, $C_3$, and $C_4$. The charge-storage capacitors 186, 192, 198, and 204 of the readout channels 78 may include the same or different capacitances. In certain embodiments, the pixel 54 described in FIG. 8 may be utilized in conjunction with the control signals from the control circuitry 36 in the techniques described above to enable a CF of the detector 22 to be set to a desired level prior to an imaging run (i.e., depending on the specific imaging application), increase the dynamic range of the detector 22 (e.g., enable that acquisition of image data with different CFs from the same pixel), and/or enable the acquisition of image data at a higher temporal resolution during multi-spectral X-ray imaging.

Technical effects of the disclosed embodiments include the detector 22 that includes CMOS pixels 54 having the pinned photodiode 76 coupled to a plurality of readout channels 78. Each readout channel 78 includes a respective transfer gate 84. Control signals from the control circuitry 36 selectively controls the diversion of the photocharge generated by the photodiode 76 to a desired readout channel 78. The multi-tap pixel 54 may be utilized in conjunction with the control signals to enable a CF of the detector 22 to be set to a desired level prior to an imaging run (i.e., depending on the specific imaging application), increase the dynamic range of the detector 22 (e.g., enable that acquisition of image data with different CFs from the same pixel), and/or enable the acquisition of image data at a higher temporal resolution during multi-spectral X-ray imaging.

This written description uses examples to disclose the subject matter, including the best mode, and also to enable any person skilled in the art to practice the subject matter, including making and using any devices or systems and performing any incorporated methods. The patentable scope of the subject matter is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:

1. A digital X-ray detector, comprising:
   a plurality of pixels, each pixel comprising a pinned photodiode, and a plurality of readout channels coupled to each pinned photodiode, wherein each readout channel comprises at least one charge-storage capacitor, an amplifier, and a transfer gate; and control circuitry coupled to each pixel of the plurality of pixels and configured to selectively control a flow of photocharge generated by each pinned photodiode to a respective at least one charge-storage capacitor of each respective readout channel via control of each respective transfer gate of each respective readout channel, wherein the control circuitry is configured to control a first transfer gate and a second transfer gate of each pixel via pulse-width modulated (PWM) signals.

2. The digital X-ray detector of claim 1, wherein the plurality of readout channels are disposed on a same side or edge of the pinned photodiode.

3. The digital X-ray detector of claim 1, wherein the plurality of readout channels comprises a first readout channel coupled to the pinned photodiode having a first charge-storage capacitor, a first amplifier, and a first transfer gate and a second readout channel coupled to the pinned photodiode having a second charge-storage capacitor, a second amplifier, and a second transfer gate, and the control circuitry is configured to control the first and second transfer gates via complementary PWM signals.

4. The digital X-ray detector of claim 3, wherein the photocharge is derived from a single exposure to X-rays emitted at a first single energy spectrum, and wherein the control circuitry is configured during integration, via control of the first and second transfer gates, to divert a first portion of the photocharge to the first charge-storage capacitor and a second portion of the photocharge to the second charge-storage capacitor, and the first portion is greater than the second portion enabling the respective pixel to have at least two gains.

5. The digital X-ray detector of claim 1, wherein the control circuitry is configured to set an on time and an off time for each transfer gate of each pixel of the plurality of pixels prior to an X-ray exposure.

6. The digital X-ray detector of claim 1, wherein the control circuitry is configured to control each transfer gate of each pixel via control signals applied to each respective transfer gate in synchrony with X-ray source pulse signals received from a source controller coupled to an X-ray source.

7. The digital X-ray detector of claim 6, wherein the plurality of readout channels comprises a first readout channel coupled to the pinned photodiode having a first charge-storage capacitor, a first amplifier, and a first transfer gate and a second readout channel coupled to the pinned photodiode having a second charge-storage capacitor, a second amplifier, and a second transfer gate, and wherein the control circuitry is configured to control the first and second transfer gates via the control signals in synchrony with the X-ray source pulse signals to divert a first photocharge derived from X-rays emitted at a first X-ray spectrum to the first charge-storage capacitor and to divert a second photocharge derived from X-rays emitted at a second X-ray spectrum to the second charge-storage capacitor, and the first X-ray spectrum is different from the second X-ray spectrum.

8. The digital X-ray detector of claim 1, comprising readout circuitry coupled to each readout channel of each pixel of the plurality of the pixels and configured to read image data from each readout channel, wherein the readout circuitry is configured to sequentially read out image data from the first and second readout channels without resetting the respective pixel.

9. The digital X-ray detector of claim 1, wherein the control circuitry is configured to electrically steer the flow of the photocharge to a desired readout channel coupled to each respective pinned photodiode by biasing the other readout channels coupled to the respective pinned photodiode with voltage having an opposite polarity from voltage applied to the desired readout channel.

10. The digital X-ray detector of claim 1, wherein each readout channel of the plurality of readout channels comprises two or more charge-storage capacitors.

11. The digital X-ray detector of claim 1, wherein each pixel of the plurality of pixels comprises a complementary metal-oxide-semiconductor pixel.

12. An X-ray imaging method, comprising:
   on a digital X-ray detector comprising a plurality of pixels, wherein each pixel comprises a pinned photodiode, a plurality of readout channels coupled to the pinned photodiode, and each readout channel comprises at least one charge-storage capacitor, an amplifier, and a transfer gate, performing the steps of:
   resetting a capacitance of each pixel;
   during integration, generating a photocharge in each pinned photodiode^ wherein the photocharge is derived from a single exposure to X-rays emitted at a single energy spectrum;
   during integration, for each pixel, diverting a first portion of the photocharge to a first charge-storage capacitor of a first readout channel of the plurality of readout channels coupled to a respective pinned photodiode and diverting a second portion of the photocharge to a second charge-storage capacitor of a second readout channel of the plurality of readout channels coupled to the respective pinned photodiode; wherein diverting the first and second portions of the photocharge comprises controlling a first transfer gate of the first readout channel and a second transfer gate of the second readout channel with pulse-width modulated signals;

reading out from each pixel of the plurality of pixels, via readout circuitry, image data from the first and second readout channels; and generating an exposure image based on the image data acquired from the first readout channel, the second readout channel, or both the first and second readout channels of each pixel of the plurality of pixels.

13. The X-ray imaging method of claim 12, wherein the second portion of the photocharge is greater than the first portion of the photocharge.

14. The X-ray imaging method of claim 13, wherein the image data acquired from the first readout channels of the pixels comprises a first gain value and the image data acquired from the second readout channels of the pixels comprises a second gain value, and the second gain value is greater than the first gain value.

15. The X-ray imaging method of claim 14, wherein the exposure image is generated based on image data from both the first and second readout channels of the pixels, and a first portion of the exposure image is generated utilizing the image data with the first gain value and a second portion of the exposure image is generated utilizing the image data with the second gain value.

16. The X-ray imaging method of claim 12, wherein diverting a first portion of the photocharge to the first charge-storage capacitor and diverting a second portion of the photocharge to the second charge-storage capacitor comprises providing, via control circuitry coupled to each respective transfer gate of each respective readout channel, complementary control signals to the respective transfer gates.

17. An X-ray imaging method, comprising:
on a digital X-ray detector comprising a plurality of pixels, wherein each pixel comprises a pinned photodiode, a plurality of readout channels coupled to the pinned photodiode, and each readout channel comprises at least one charge-storage capacitor, an amplifier, and a transfer gate, and wherein the plurality of readout channels comprises a first readout channel coupled to the pinned photodiode having a first charge-storage capacitor, a first amplifier, and a first transfer gate, a second readout channel coupled to the pinned photodiode having a second charge-storage capacitor, a second amplifier, and a second transfer gate, a third readout channel coupled to the pinned photodiode having a third charge-storage capacitor, a third amplifier, and a third transfer gate, performing the steps of:

controlling the first, second, and third transfer gates of each respective readout channel of the plurality of readout channels of each respective pixel of the plurality of pixels, via pulse-width modulated control signals from control circuitry coupled to each pixel of the plurality of pixels, in synchrony with X-ray source pulse signals to divert a first photocharge derived from X-rays emitted at a first X-ray spectrum to the first charge-storage capacitor, to divert a second photocharge derived from X-rays emitted at a second X-ray spectrum to the second charge-storage capacitor, and to divert a third photocharge derived from X-rays emitted at a third X-ray spectrum to the third charge-storage capacitor, and the first X-ray spectrum is different from the second X-ray spectrum and the third X-ray spectrum is different from both the first and second X-ray spectrums;

reading out from each pixel of the plurality of pixels, via readout circuitry, image data from the first, second, and third readout channels; and generating a first exposure image based on the image data acquired from the first readout channel, a second exposure image based on the image data acquired from the second readout channel of each pixel of the plurality of pixels, and a third exposure image based on the image data acquired from the third readout channel of each pixel of the plurality of pixels during sequential X-ray exposures at different X-ray spectrums.

18. The X-ray imaging method of claim 17, wherein reading out from each pixel of the plurality of pixels, via the readout circuitry, the image data from the first, second, and third readout channels is read out at a native frame rate of the digital X-ray detector.

* * * * *